US008233797B2

(12) United States Patent
Qian et al.

(10) Patent No.: US 8,233,797 B2
(45) Date of Patent: Jul. 31, 2012

(54) SINGLE WAVELENGTH SOURCE-FREE OFDMA-PON COMMUNICATION SYSTEMS AND METHODS

(75) Inventors: Dayou Qian, Plainsboro, NJ (US); Neda Cvijetic, Plainsboro, NJ (US); Junqiang Hu, Princeton, NJ (US); Ting Wang, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 557 days.

(21) Appl. No.: 12/545,159

(22) Filed: Aug. 21, 2009

(65) Prior Publication Data

US 2010/0215368 A1 Aug. 26, 2010

Related U.S. Application Data

(60) Provisional application No. 61/154,899, filed on Feb. 24, 2009.

(51) Int. Cl.
*H04B 10/20* (2006.01)
*H04J 14/00* (2006.01)

(52) U.S. Cl. ............... 398/67; 398/63; 398/72
(58) Field of Classification Search ............ 398/63, 398/67, 72
See application file for complete search history.

(56) References Cited

U.S. PATENT DOCUMENTS

| | | | | |
|---|---|---|---|---|
| 2008/0279556 A1* | 11/2008 | Yu et al. | ............... | 398/72 |
| 2009/0214210 A1* | 8/2009 | Yu et al. | ............... | 398/65 |
| 2009/0274462 A1* | 11/2009 | Yu | ............... | 398/68 |
| 2009/0290878 A1* | 11/2009 | Yu et al. | ............... | 398/79 |
| 2010/0142955 A1* | 6/2010 | Yu et al. | ............... | 398/72 |
| 2010/0158512 A1* | 6/2010 | Chang et al. | ............... | 398/7 |

OTHER PUBLICATIONS

Dayou Qian et al., 10-Gb/s OFDMA-PON for Delivery of Heterogeneous Services, 2008 IEEE/OSA Optical Fiber Conference, Optical Society of America, 3pgs, Feb. 24, 2008.

Ki-Man Choi et al., Colorless Operation of WDM-PON based on Wavelength Locked Fabry-Perot Laser Diode, Proceedings of the 2005 European Conference on Optical Communications (ECOC), 2pgs, Sep. 25, 2005.

C.W. Chow et al., Rayleigh noise mitigation in DWDM LR-PONs using carrier suppressed subcarrier-amplitude modulated phase shift keying, Optical Society of America, Optics Express, Jan. 28, 2008, pp. 1860-1866, vol. 16, No. 3.

* cited by examiner

*Primary Examiner* — Nathan Curs
(74) *Attorney, Agent, or Firm* — James Bitetto; Joseph Kolodka

(57) ABSTRACT

Methods and systems for processing communication signals in an Orthogonal Frequency Division Multiple Access (OFDMA)-Passive Optical Network (PON) are disclosed. An optical carrier at a wavelength generated at an optical line terminal (OLT) may be reused by optical network units (ONUs) in the network for upstream transmission of data signals to the OLT. In addition, each ONU may perform carrier suppression to avoid broadband beating noise resulting from the simultaneous transmission of upstream data signals on the same wavelength. Further, the optical source at the OLT used to generate the optical carrier may be reused as a local oscillator for coherent detection of received upstream signals to minimize any frequency offsets.

20 Claims, 7 Drawing Sheets

SINGLE WAVELENGTH SOURCE-FREE OFDMA-PON COMMUNICATION SYSTEMS AND METHODS

RELATED APPLICATION INFORMATION

This application claims priority to provisional application Ser. No. 61/154,699 filed on Feb. 24, 2009, incorporated herein by reference.

BACKGROUND

1. Technical Field

The present invention relates to optical network communication systems, and more particularly, to Optical Frequency Division Multiple Access (OFDMA)-Passive Optical Network (PON) communication systems.

2. Description of the Related Art

Next generation optical access networks are expected to provide simultaneous delivery of multiple services for a number of different customers over a common network architecture. For example, such services may include providing legacy Digital Signal 1 (T1)/E1 carrier traffic, digital multimedia transmission, backhaul for cellular base stations, layer-2 Virtual Private Network (VPN), security channels for storage networks, etc. To provide such services while effectively managing costs, service providers should have a certain flexibility and should be capable of supporting heterogeneous optical network units (ONUs) employing a variety of services and data rates at the customer premises of a given optical access network.

Several different optical access network architectures have been developed to address the problem. Time division multiplexing (TDM)-based Gigabit Ethernet (GE)-Passive Optical Network (PON) and 10 Gigabyte (G)-PON network 100, illustrated in FIG. 1, is one exemplary optical access network that is currently known in the art. Network 100 may include an optical network unit (ONU) 104 configured to transmit Ethernet packets 106 to an optical line terminal (OLT) 102 using an analog signal to packets converter 108 and a Hub/Router 110. In turn, the OLT 102 may receive the Ethernet packets 106 and process the packets using a Hub/router 112 and a packets to analog signal converter 114. Here, the OLT 102 apportions usage in a time-domain round-robin fashion among multiple ONUs 104 such that, during each time slot, only one ONU can transmit or receive signals. As a result, TDM-based PONs require complex scheduling algorithms and framing technology to support heterogeneous services. Moreover, performance is highly sensitive to packet latency and the services are not transparent to other traffic concurrently flowing through the same link. Furthermore, in TDM-based PONs, it may be difficult for a single OLT to concurrently support ONUs with different line rates.

Another optical access network system known in the art includes a Wavelength Division Multiplexed (WDM)-PON 200, illustrated in FIG. 2, which assigns each ONU in the network a different wavelength for transmitting and receiving signals. WDM-PON system 200 may include a plurality of ONUs 202-206, an OLT 208 and WDM Multiplexers 210 and 212, which may be implemented with arrayed waveguide gratings. In the particular architecture shown in FIG. 2, ONU 202 may be assigned wavelengths $\lambda_1$ and $\lambda_2$ for transmission of analog baseband T1/E1 signals 214 and Ethernet packets 216, respectively, and ONU 202 may employ transmitters 222 and 224 to transmit converted signals 214 and 216 on wavelengths $\lambda_1$ and $\lambda_2$, respectively. Similarly, ONU 204 may be assigned wavelength $\lambda_3$ for transmission of analog wireless signals 218 using transmitter 226 and ONU 206 may be assigned wavelength $\lambda_4$ for transmission of Ethernet packets 220 using transmitter 228. The multiplexer 212 may be configured to multiplex optical carriers transmitted from the ONUs and multiplexer 210 in OLT 208 may receive, demultiplex and forward the signals to a receiver array in the OLT 208. For example, signals transmitted along wavelengths $\lambda_1$-$\lambda_4$ may be respectively forwarded to receivers 230-236 and further processed in the OLT 208 to obtain signals 214-220, respectively.

A WDM-PON architecture can transparently deliver multiple services to a collection of ONUs, as each ONU can use a dedicated wavelength. Colorless WDM-PON architectures are also currently available. However, this multiple wavelength arrangement requires multiple transceivers and arrayed-waveguide gratings or optical filters to correctly distribute wavelengths, which notably increases both system cost and complexity. In addition, WDM-PON lacks the flexibility to dynamically allocate bandwidth resources among different services. Further, while WDM-PON can support heterogeneous ONUs through a receiver array at the OLT, it still lacks the ability to readily and easily upgrade the ONUs at customer sites. For example, because each ONU is wavelength-specific, all ONU upgrades mandate corresponding changes at the OLT.

WDM Orthogonal Frequency Division Multiple Access (OFDMA)-PON is another known optical network architecture. In OFDMA-PON, the time and orthogonal-frequency domain bandwidth resource allocation is controlled by the OLT and communicated to the ONUs over non-reserved Orthogonal Frequency Division Multiplexing (OFDM) subcarriers and pre-configured time slots, such that each ONU can be assigned one or more subcarriers in a given time slot. With reference to FIG. 3, one exemplary OFDMA-PON 300 is illustrated. Network 300 may include an OLT 302, ONUs 304, 306 and 308, which may be respectively located at a business area 310, a mobile station 312 and a residential area 314. ONU 304 transmits Ethernet packets 316 over a wavelength $\lambda_1$, ONU 306 transmits analog wireless signals 318 over $\lambda_2$ and ONU 308 transmits Ethernet packets 320 over $\lambda_3$. Upstream data signals may be transmitted from the ONUs to the OLT by employing a splitter/coupler 322, which multiplexes signals received by different ONUs. The overall bandwidth can be divided into both orthogonal frequency-domain subcarriers and time-domain slots, such that each ONU can be assigned one or more subcarriers in a given time slot. One ONU frame is illustrated in element 324, with frequency as the vertical axis and time as the horizontal axis. Element 326 illustrates the bandwidth allocation to the various ONUs with frequency as the vertical axis and time as the horizontal axis. As noted above, the time and frequency domain bandwidth resource allocation is controlled by the OLT. In this way, the OLT in an OFDMA-PON can support heterogeneous ONUs using a single OLT and single optical receiver. However, for upstream traffic, each ONU would still require the use of different wavelengths to avoid broadband beating noise that would otherwise be generated at the OLT receiver due to mixing of multiple optical carriers from the ONUs. Under this arrangement, the upstream OFDMA-PON would need to be combined with WDM technology, which reduces its cost-efficiency.

SUMMARY

Exemplary features of the present invention address the deficiencies of the prior art by providing a variety of services to heterogeneous optical network units (ONUs) at customer premises while at the same time reducing cost and complexity. For example, exemplary embodiments of the present invention simplify upstream transmission from a network of ONUs to an optical line terminal (OLT) so that it employs only a single wavelength generated by an optical source in the OLT. In particular, exemplary embodiments may use ONU-side optical carrier suppression to avoid broadband beating noise that is created when multiple ONUs simultaneously transmit upstream signals on the same wavelength. Moreover, exemplary optical line terminals may reuse the optical source generating the wavelength for upstream transmission as a local oscillator for coherent detection in the OLT to minimize any frequency offset and simplify post-photodetection digital processing.

One exemplary embodiment of the present invention includes a system for processing communication signals in an OFDMA-PON, the system including: an OLT configured to transmit first signals on a wavelength generated by an optical source in the OLT; a plurality of ONUs, wherein each ONU is configured to receive the first signals on the wavelength, perform carrier suppression on an optical carrier on the wavelength received from the OLT and modulate the suppressed optical carrier to generate upstream optical OFDM data signals for transmission to the OLT.

Another exemplary embodiment of the present invention includes a method for processing communication signals in an OLT of an OFDMA-PON, the method including the steps of: generating first signals that are on a wavelength generated by an optical source in the OLT; distributing the first signals to a plurality of ONUs; and performing coherent detection on upstream optical OFDM data signals received from the ONUs on the wavelength by reusing the optical source in the OLT as a local oscillator to minimize frequency offset of the upstream signals.

Another exemplary embodiment of the present invention includes a method for processing communication signals in an ONU of an OFDMA-PON, the method including the steps of: receiving first signals on a wavelength from an OLT; performing carrier suppression, at the ONU, on an optical carrier on the wavelength received from the OLT; and modulating the suppressed optical carrier to generate upstream optical OFDM data signals for transmission on the suppressed optical carrier on the wavelength.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
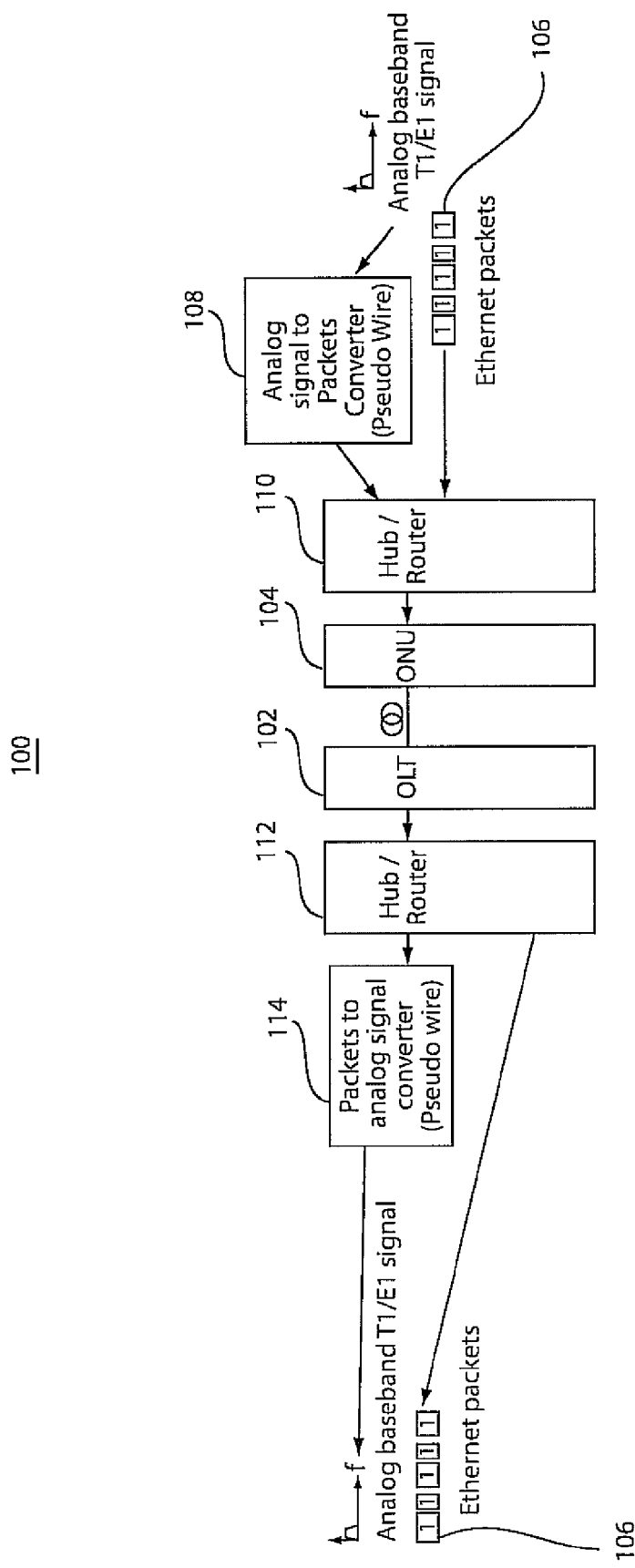
FIG. 1 is a block/flow diagram of a prior art TDM-based GE-PON and 10G-PON architecture.
Figure 2:
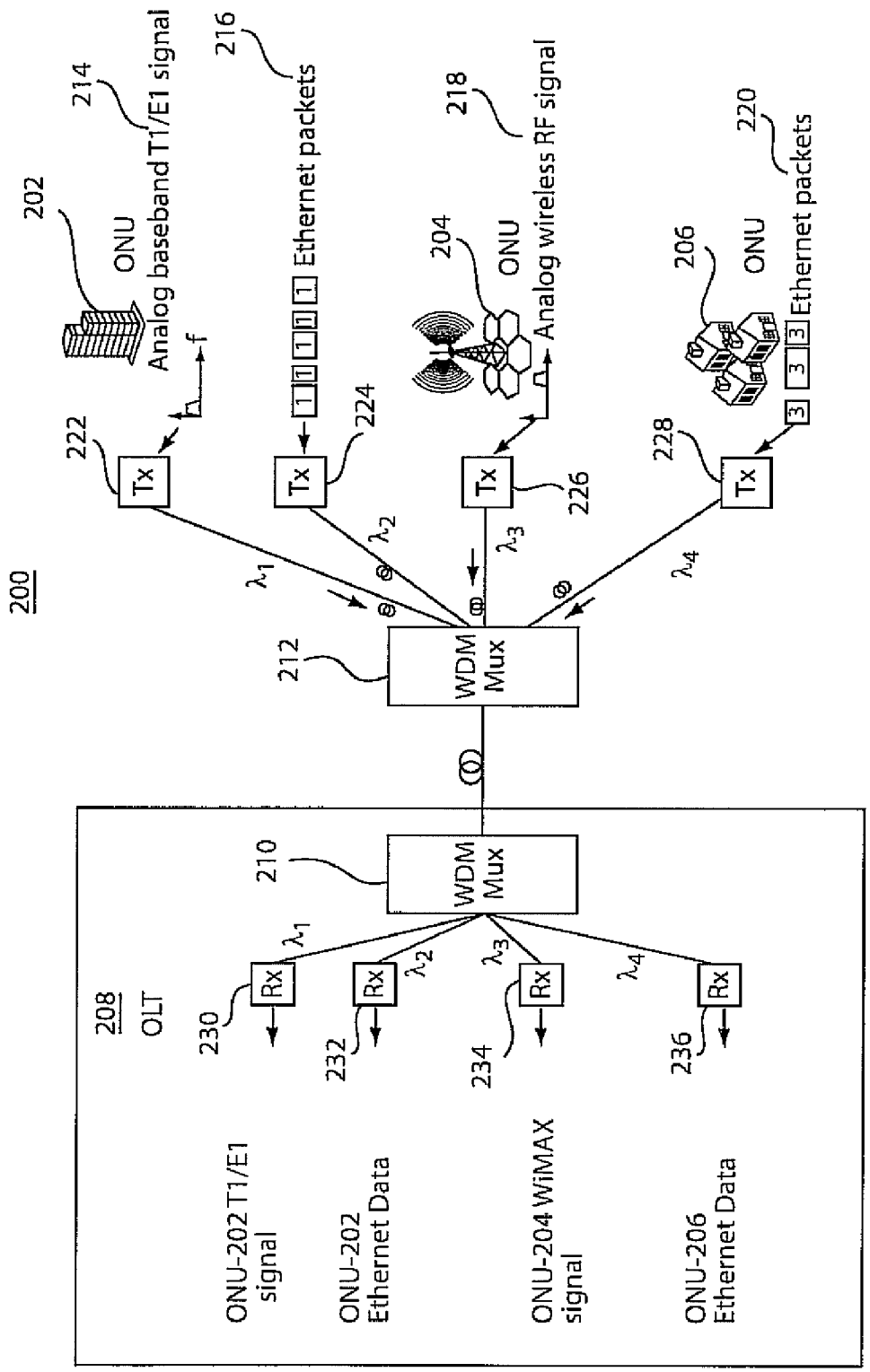
FIG. 2 is a block/flow diagram of a prior art WDM-PON architecture.
Figure 3:
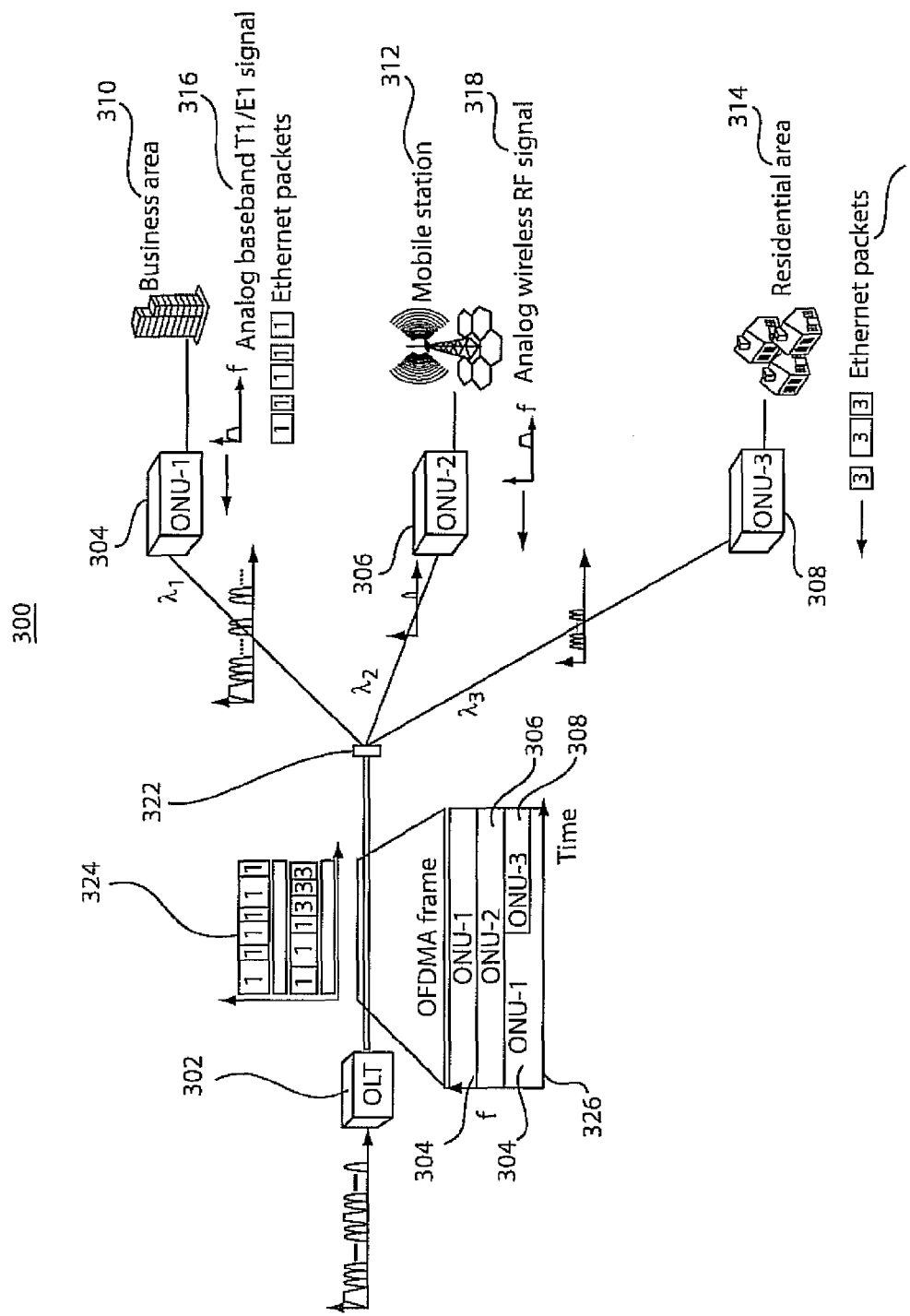
FIG. 3 is a block/flow diagram of a prior art OFDMA-PON architecture.
Figure 4:
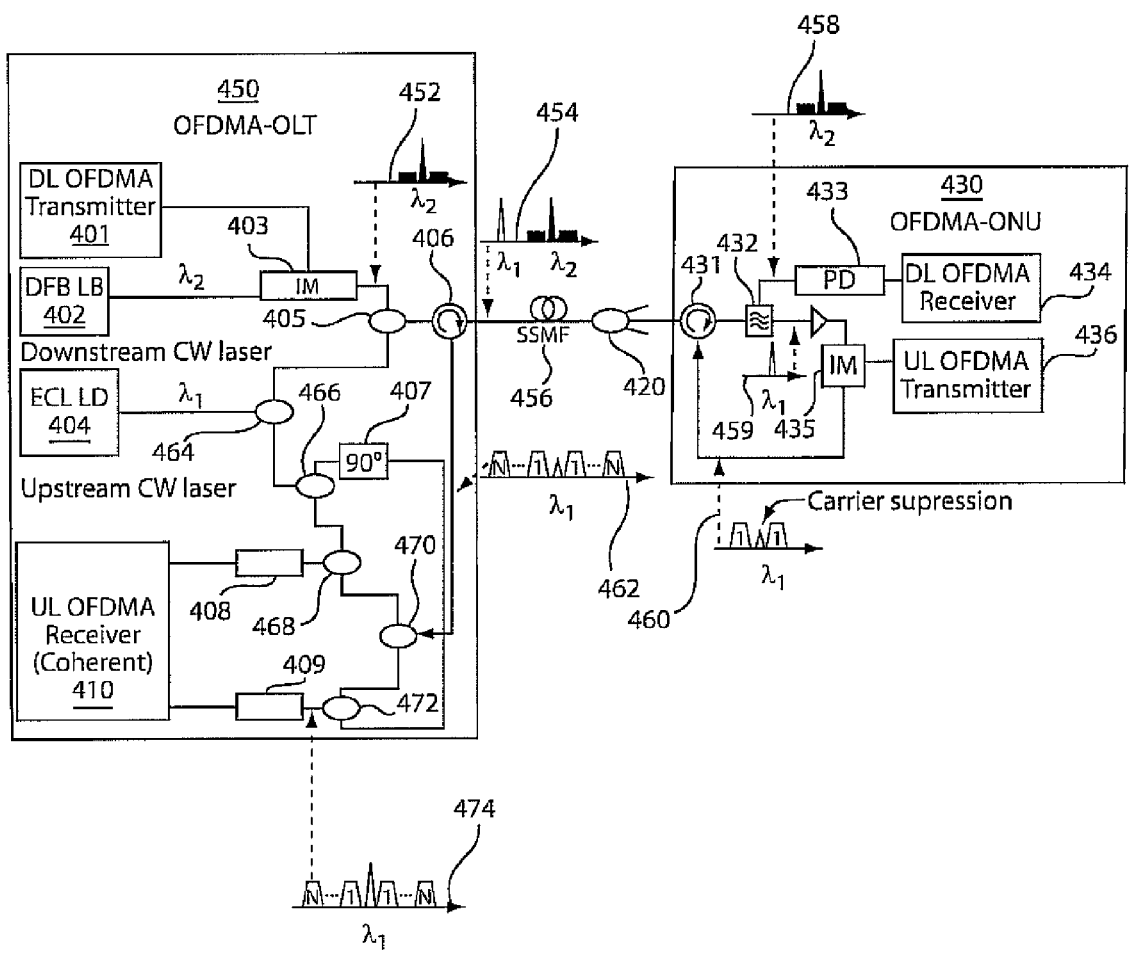
FIG. 4 is a block/flow diagram of a system for processing communication signals in an OFDMA-PON in accordance with an exemplary embodiment of the present invention.

Referring now in detail to the figures in which like numerals represent the same or similar elements and initially to FIG. 4, a system 400 for processing communication signals in an OFDMA-PON in accordance with an exemplary embodiment of the present invention is illustrated. In the exemplary embodiment shown in FIG. 4, the downlink transmission from the OLT 450 to the ONU 430 is similar to the previously proposed WDM-OFDMA-PON discussed above, where an OFDMA downlink (DL) transmitter 401 in the OLT 450 maps all downstream data to different frequency-domain OFDM subcarriers and broadcasts it to all of the ONUs over one wavelength, which is referred to here as $\lambda_2$.

Figure 5:
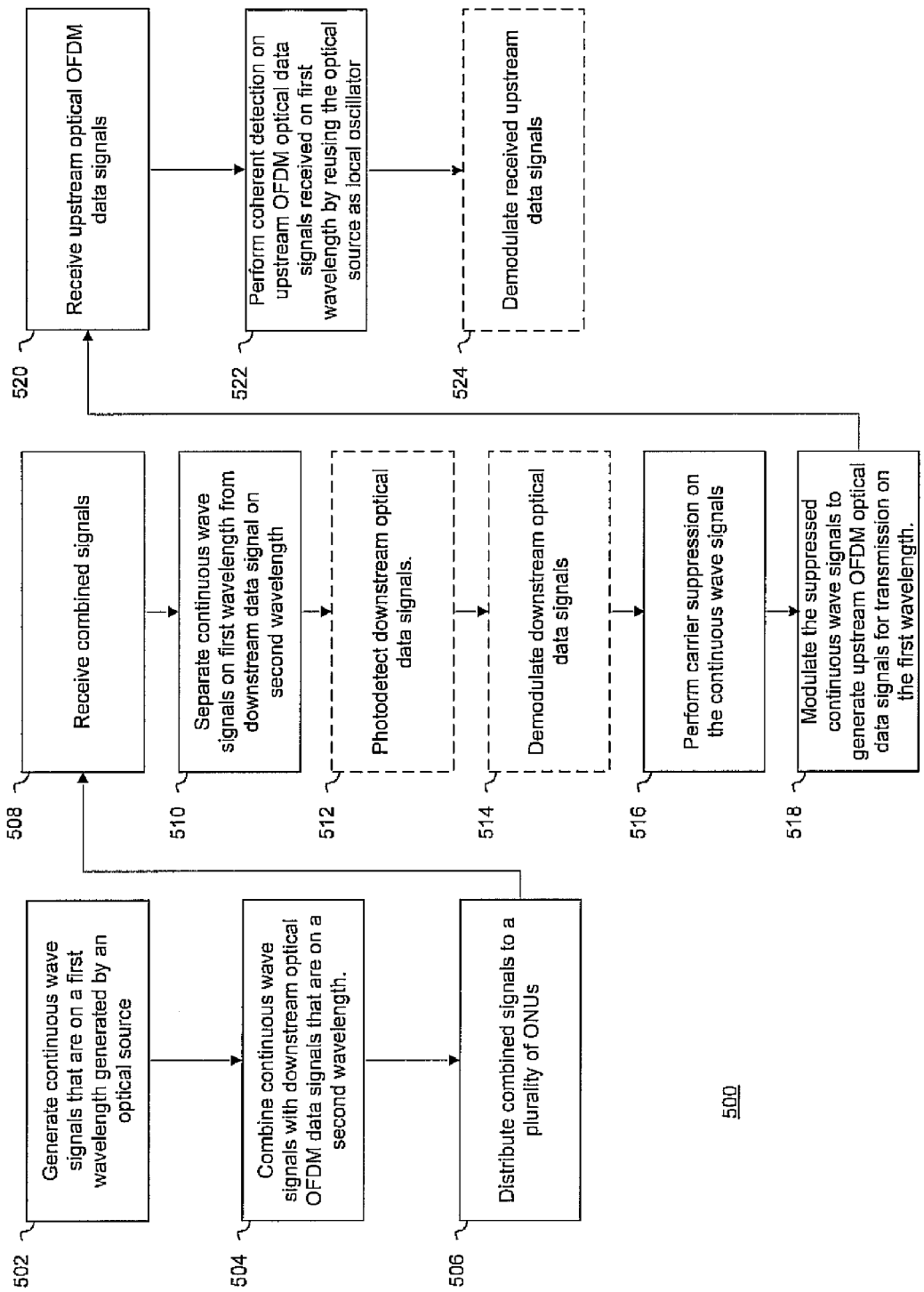
FIG. 5 is a block/flow diagram of a method for processing communication signals in an OFDMA-PON in accordance with an exemplary embodiment of the present invention.

Reference is now made to FIG. 5, with continuing reference to FIG. 4 and system 400, to illustrate novel aspects of the present invention. However, it should be understood that the embodiments described herein below are merely exemplary and that other configurations may be employed. In FIG. 5, a method 500 for processing communication signals in an OFDMA-PON is shown. As discussed herein below, steps 502-506 and 520-524 may be performed by OLT 450 while steps 508-518 may be performed by ONUs.

Method 500 may begin at step 502, in which the OLT 450 may generate continuous wave (CW) signals on a first wavelength $\lambda_1$ and may generate downstream optical OFDM data signals on a second wavelength $\lambda_2$. The continuous wave signals may be generated in the OLT 450 by employing an external cavity laser (ECL) 404 operating at wavelength $\lambda_1$ while the downstream OFDM optical data signals may be generated using the DL transmitter 401, as discussed above, a distributed feedback (DFB) laser diode (LD) 402 operating at wavelength $\lambda_2$ and an intensity modulator (IM) 403 operating at wavelength $\lambda_2$, which modulates CW signals on $\lambda_2$ provided by LD 402. An electrical OFDMA signal generated using an inverse Fast Fourier Transform (IFFT) may be used to drive IM 403. The spectrum of the downstream data signals, which is centered about $\lambda_2$, is illustrated in element 452 of FIG. 4. In element 452, and also in elements 454, 458, 460, 462 and 474, described below, optical intensity corresponds to the vertical axis and wavelength corresponds to the horizontal axis.

One of the novel features of the exemplary embodiment includes combining the downstream optical data signals on wavelength $\lambda_2$ with the CW signals on $\lambda_1$ at step 504. As noted above, wavelength $\lambda_1$ is generated by optical source 404. For example, the OLT 452 may employ an optical coupler 405 to combine downstream optical data signals on wavelength $\lambda_2$ with the CW signals on $\lambda_1$ to generate the spectrum illustrated in element 454.

At step 506, the OLT 450 may distribute the combined downstream optical signals to a plurality of optical network units. For example, the combined signals may be passed through a circulator 406 for downstream transmission to ONUs via a standard single mode fiber 456 while an optical splitter/coupler 420 may be used to distribute the combined downstream signals to each OFDMA ONU. One of the ONUs, ONU 430, is shown in FIG. 4. Each ONU may receive the combined downstream signals at step 508.

Another novel feature of the exemplary embodiment includes separating optical signals on $\lambda_1$ from optical signals on $\lambda_2$ at an ONU. For example, at step 510, the continuous wave signals on the first wavelength $\lambda_1$ may be separated from the downstream data signals on the second wavelength $\lambda_2$ at each ONU. For example, after the combined signals pass a circulator 431, ONU 430 may employ an optical filter 432 to separate signals on $\lambda_1$ from signals on $\lambda_2$. As shown in element 458 of FIG. 4, the optical spectrum of the separated downstream data signals on $\lambda_2$ is approximately the same as the spectrum in element 452. In addition, the optical spectrum of the separated continuous wave signals on $\lambda_1$ is shown in element 459. Subsequently, the ONU 430 may photodetect downstream data signals on $\lambda_2$ using photodetector 433 at optional step 512 and may demodulate the downstream data signals using a downlink OFDMA Receiver 434 at optional step 514.

Another particular, novel aspect of the exemplary embodiment includes performing carrier suppression on the continuous wave signals at an ONU at step 516. For example, the CW laser signal at $\lambda_1$ may be reused by each ONU as the upstream optical source to drive an upstream intensity modulator 435. In addition, to perform carrier suppression on the CW signals or, equivalently, an optical carrier on $\lambda_1$, each ONU may be configured to adjust the direct current bias of an intensity modulator 435 such that the intensity of upstream OFDM data signals generated by uplink OFDMA transmitter 436 is higher than the intensity of the optical carrier on $\lambda_1$, as shown in element 460 of FIG. 4. ONU-side carrier suppression may be employed to achieve simultaneous upstream transmission from multiple ONUs over a single wavelength.

At step 518, each ONU may modulate the suppressed optical carrier or continuous wave signals to generate upstream OFDM optical data signals for transmission on wavelength $\lambda_1$. For example, ONU 430 may employ transmitter 436 and IM 435 to generate the upstream data signals. For example, each ONU may generate their corresponding upstream signals and upconvert them to an intermediate radio frequency (RF). Thereafter, each RF OFDMA signal may modulate the IM 435 driven by the CW source at wavelength $\lambda_1$. For upstream transmission, data signals from N different ONUs may be combined by optical splitter/coupler 420 and simultaneously transmitted to, and received by, the OFDMA-OLT 450. The spectrum of the signals combined by the splitter/coupler 420 is shown in the spectrum of element 462 of FIG. 4. It is important to note that the carrier suppression performed at each ONU, for example, at step 516, minimizes the beating noise that would otherwise be generated at the OLT due to the mixing of multiple upstream signals received from several ONUs, all operating at the common wavelength $\lambda_1$. It should also be noted that although either a single sideband optical signal or a double sideband optical signal may be used for upstream transmission, the single sideband optical signal is preferred.

Subsequent to receiving the upstream optical data signals at step 520, at step 522, the OLT 450 may perform coherent detection on the upstream optical OFDM data signals received from the ONUs on the first wavelength $\lambda_1$ to, for example, fully regenerate the OFDMA signals in the electrical domain. Further, the coherent detection may be performed by reusing the optical source 404 as a local oscillator, which is another novel feature of the exemplary embodiment. Here, using the optical source which generated wavelength $\lambda_1$ employed by the ONUs for upstream transmission during coherent detection minimizes any detrimental frequency offset of the upstream signals which would otherwise be corrected in the electrical domain. To implement coherent detection, the OLT 450 may couple the upstream optical signals with a continuous wave signal at $\lambda_1$. For example, after the upstream data signals are passed through the optical circulator 406, the OLT 450 may couple upstream data signals with a continuous wave signal generated by laser diode 404 by employing a 90 degree optical hybrid 407, splatters 464, 466 and 470 and couplers 468 and 472 to generate the optical spectrum shown in element 474. As shown in element 474, the continuous wave signal has a higher intensity than the intensities of the upstream data signals. For example, the intensity of the upstream data signals should be 12-20 dB higher than the intensity of the continuous wave signal generated by optical source 404. The OLT 450 may photodetect the coupled signals using photodetectors 408 and 409. Additionally, the OLT may subsequently employ the uplink (UL) OFDMA receiver 410 for post-detection electronic processing of the received data signals to, for example, demodulate the upstream data signals at optional step 524.

Figure 6:
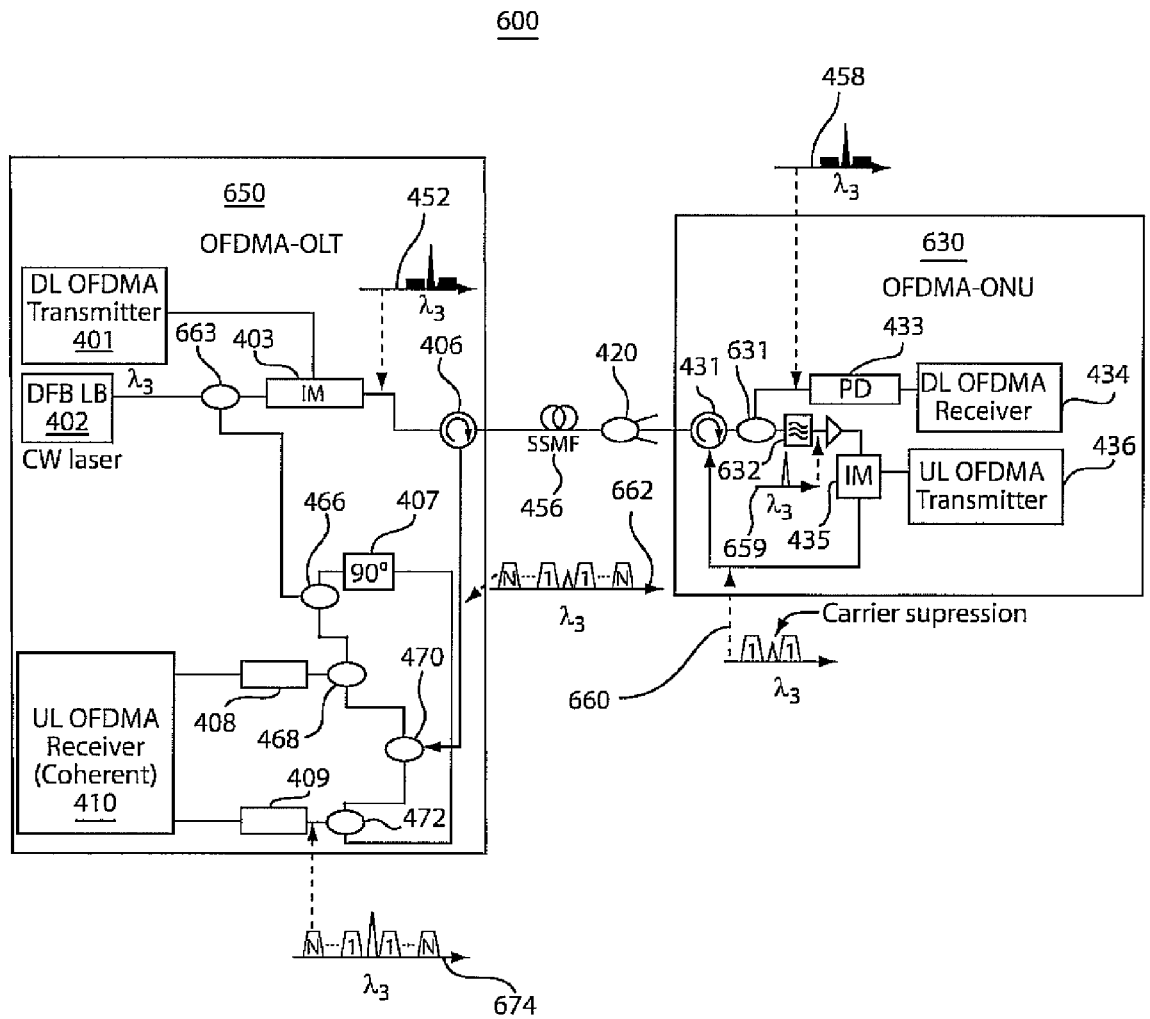
FIG. 6 is a block/flow diagram of a system for processing communication signals in an OFDMA-PON in accordance with an alternative exemplary embodiment of the present invention.

It should also be noted that as opposed to using two separate OLT lasers 402 and 404, the downstream wavelength used for downstream data signals, $\lambda_2$ in FIG. 4, may be used for upstream traffic in alternative embodiments. For example, a system 600 for processing communication signals in an OFDMA-PON in accordance with an alternative exemplary embodiment of the present invention is illustrated in FIG. 6. System 600 is similar to system 400; however, system 600 uses a single optical source at the OLT as opposed to two optical sources. For example, as shown in FIG. 6, a splitter 663 is provided between the laser diode 402 and the intensity modulator 403 in OLT 650 to feed a continuous wave signal at $\lambda_3$ to coherent detection elements described above. In addition, a splitter 631 followed by a filter 632 is employed at the ONU 630 so that the downstream data on wavelength $\lambda_3$ is filtered out and the same optical carrier on $\lambda_3$ used to carry downstream signals is then utilized for upstream data signals transmitted from ONUs to the OLT. Here, the wavelength generated by source 402 may of course be at the same wavelength value as the wavelength generated by source 402 described above with respect to system 400.

Figure 7:
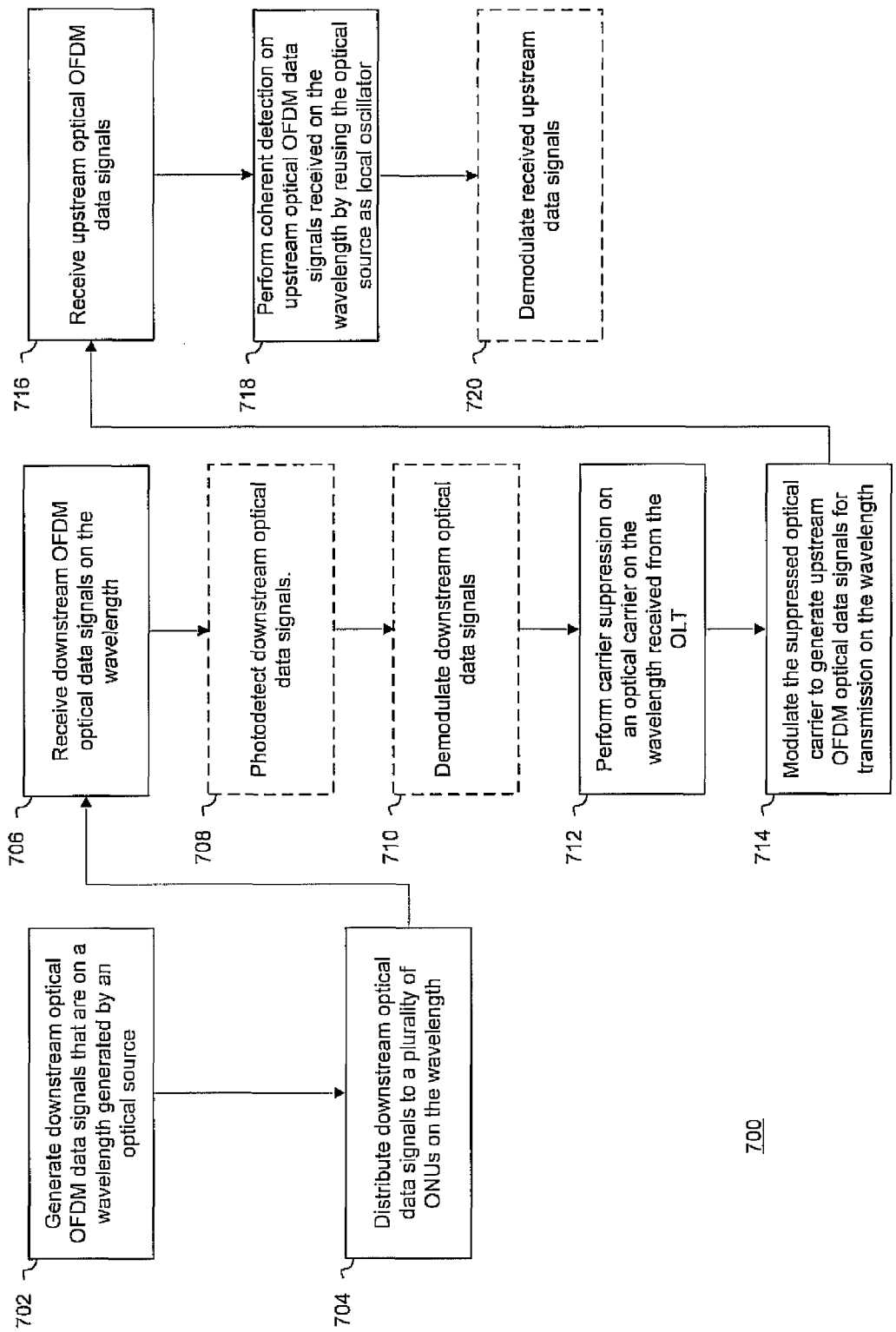
FIG. 7 is a block/flow diagram of a system for processing communication signals in an OFDMA-PON in accordance with an alternative exemplary embodiment of the present invention.

Referring now to FIG. 7 with continuing reference to FIG. 6, a method 700 for processing communication signals in an OFDMA-PON is illustrated. As discussed herein below, steps 702-704 and 716-720 may be performed by OLT 650 while steps 706-714 may be performed by ONUs. Method 700 may begin at step 702, in which OLT 650 may generate downstream optical OFDM data signals that are on wavelength $\lambda_3$. Wavelength $\lambda_3$ is generated by optical source 402. As stated above, optical source 402 may correspond to a distributed feedback laser diode. Alternatively, the optical source may correspond to an external cavity laser diode. Further, transmitter 401 may be employed to generate the downstream data signals. Similar to method 600, the transmitter 401 in the OLT 430 may be configured to map all downstream data to different OFDMA subcarriers and may broadcast to all ONUs over wavelength $\lambda_3$. In addition, intensity modulator 403 may modulate continuous wave signals on wavelength $\lambda_3$ that are provided by optical source 402. The spectrum of the data signals is illustrated in element 452.

At step 704, the OLT 650 may distribute the downstream optical signals to a plurality of ONUs, of which ONU 630 is an example. As noted with regard to method 400, the downstream signals may pass through a circulator 406 for transmission through a single mode fiber 456, for example. In addition, optical coupler/splitter 420 may be employed to distribute the downstream signals to each ONU.

At step 706, each ONU may receive the downstream optical data signals on wavelength $\lambda_3$. For example, the downstream data signals may pass through circulator 431 and splitter 631, which routes the data signals to photodetector 433. The spectrum of the signals sent to photodetector 433 is shown in element 458 and is the same downstream data signals transmitted by OLT 650. Optionally, at step 70B, the downstream optical data signals may be photodetected by photodetector 433 and, optionally at step 710, demodulated by receiver 434. The filter 632, after receiving the downstream signals from the splitter 631, may also route a base optical carrier on $\lambda_3$ employed for the downstream data signals to the intensity modulator 435. Similar to method 500, the ONUs may employ the optical carrier received on wavelength $\lambda_3$ from the OLT as an optical carrier for upstream data signals transmitted to the OLT on wavelength $\lambda_3$. However, here, in embodiments 600 and 700, the optical carrier on $\lambda_3$ on which the downstream data signals were transmitted to the ONUs is reused by each ONU as an optical carrier for upstream data signals.

At step 712, each ONU may perform carrier suppression on an optical carrier received from the OLT on $\lambda_3$. For example, similar to method 500, each ONU may adjust a direct current bias of intensity modulator 435 such that the intensity of the upstream OFDM optical data signals is higher than the intensity of the optical carrier at $\lambda_3$. As discussed above, the carrier suppression minimizes beating noise at the OLT 650 stemming from receiving the upstream signals from the plurality of ONUs operating on the same wavelength.

At step 714, each ONU, such as ONU 630, may modulate the suppressed optical carrier on $\lambda_3$ to generate upstream OFDM data signals for transmission to the OLT 650 on the optical carrier on $\lambda_3$. For example, uplink OFDMA transmitter 436 and intensity modulator 435 may be employed to generate the modulated signals on the optical carrier on wavelength $\lambda_3$ received from OLT 650. The optical spectrum of the upstream data signals is shown in element 660. In element 660, and also in elements 662 and 674, described below, optical intensity corresponds to the vertical axis and wavelength corresponds to the horizontal axis. As noted above, data signals for upstream transmission from N different ONUs may be combined by coupler/splitter 420 and transmitted to the OLT.

After receiving the upstream OFDM signals at step 716, the OLT 650 may perform coherent detection at step 718 on the upstream OFDM optical data signals received from the ONUs on wavelength $\lambda_3$ by reusing the optical source as a local oscillator. For example, the same optical source 402 that originally generated the carrier wavelength on which the upstream signals were transmitted may be reused as a local oscillator to generate a continuous wave signal at $\lambda_3$ for coherent detection purposes. For example, OLT 650 may perform coherent detection by coupling the upstream optical signals with the continuous wave signal at $\lambda_3$ by employing a 90 degree optical hybrid 407, splitters 663, 466 and 470 and couplers 468 and 472 to generate the optical spectrum shown in element 674. As shown in element 674, the continuous wave signal at $\lambda_3$ generated by source 402 has a higher intensity than the intensities of the upstream data signals. For example, the intensity of the upstream data signals should be 12-20 dB higher than the intensity of the continuous wave signal generated by optical source 402. The OLT 650 may photodetect the coupled signals using photodetectors 408 and 409. In addition, the OLT may subsequently employ the uplink (UL) OFDMA receiver 410 for post-detection electronic processing of the received data signals. As discussed above, utilizing the optical source which generated the optical carrier for the upstream data signals as a local oscillator for coherent detection in the OLT minimizes any frequency offset that would otherwise have to be corrected during post-detection electronic processing of the received data signals. Subsequently, the receiver 410 may be used to demodulate the upstream data signals at optional step 720.

It should be noted that systems 400 and 600 of FIGS. 4 and 6, respectively may also be implemented using a plurality of fibers. For example, rather than using a single fiber for both downstream and upstream transmissions, one fiber may be employed for downstream transmissions while a different fiber may be employed for upstream transmissions.

The exemplary methods and systems discussed above of a low-complexity upstream architecture, as a single laser source may be employed for all upstream transmissions. Thus, novel features of exemplary embodiments include: transparent pipes for transmission of arbitrary analog or digital signals and flexible, extensible heterogeneous service delivery over a common network. At the same time, upstream ONU-side cost and complexity is reduced. In addition, the coherent receiver embodiments discussed at the OLT can improve transmission performance and also enable polarization-multiplexed transmission. Other benefits of the systems and methods disclosed herein include backward and forward compatibility with existing optical network architectures. Furthermore, exemplary aspects of the present invention provide a convenient means for upgrading ONUs and for providing the services at different transmission rates.

It should be understood that embodiments described herein may be entirely hardware or including both hardware and software elements. In one embodiment, the present invention is implemented in hardware and software, which includes but is not limited to firmware, resident software, microcode, etc. The software may be implemented in a controller or processor (not shown) which may direct the hardware elements discussed above to perform the method steps discussed above.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device). The medium may include a computer-readable medium such as a semiconductor or solid state memory, magnetic tape, a removable computer diskette, a random access memory (RAM), a read-only memory (ROM), a rigid magnetic disk and an optical disk, etc.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A system for processing communication signals in an Orthogonal Frequency Division Multiple Access (OFDMA)-Passive Optical Network (PON) comprising:

an optical line terminal (OLT) configured to transmit first signals on a wavelength generated by an optical source in the OLT;

a plurality of optical network units (ONUs), wherein each optical network unit (ONU) is configured to receive the first signals on the wavelength, perform carrier suppression on an optical carrier on the wavelength received from the OLT while modulating the optical carrier to generate upstream optical OFDM data signals for transmission to the OLT on the wavelength.

2. The system of claim 1, wherein the OLT is further configured to perform coherent detection on the upstream OFDM optical data signals received from the ONUs on the wavelength by reusing the optical source in the OLT as a local oscillator to minimize frequency offset of the upstream signals.

3. The system of claim 2, wherein the upstream optical data signals are received simultaneously.

4. The system of claim 2, wherein the OLT is further configured to couple the upstream optical data signals with a continuous wave signal, generated by the optical source in the OLT, such that the continuous wave signal has a higher intensity than the intensities of the upstream optical data signals.

5. The system of claim 4, wherein the OLT is further configured to photodetect the upstream optical data signals after coupling the upstream optical data signals with the continuous wave signal.

6. The system of claim 1, wherein each of the ONUs is further configured to perform the carrier suppression by adjusting a direct current bias such that the intensity of the upstream OFDM optical data signals is higher than the intensity of the optical carrier on the wavelength so as to minimize beating noise at the OLT stemming from receiving the upstream signals from the plurality of ONUs operating on the same wavelength.

7. The system of claim 1, wherein the first signals are continuous wave signals, wherein said wavelength is a first wavelength and wherein said OLT is further configured to combine the continuous wave signals with downstream optical Orthogonal Frequency Division Multiplexed (OFDM) data signals on a second wavelength that is generated by a different optical source in the OLT.

8. The system of claim 7, wherein each ONU is further configured to receive the combined signals and separate the continuous wave signals on the first wavelength from the downstream optical data signals on the second wavelength and wherein each ONU is configured to modulate the continuous wave signals to generate said upstream optical OFDM data signals for transmission on the first wavelength.

9. The system of claim 1, wherein the first signals are downstream optical Orthogonal Frequency Division Multiplexed (OFDM) data signals.

10. A method for processing communication signals in an optical line terminal (OLT) of an Orthogonal Frequency Division Multiple Access (OFDMA)-Passive Optical Network (PON) comprising:

generating first signals that are on a wavelength generated by an optical source in the OLT;

distributing the first signals to a plurality of optical network units (ONUs); and performing coherent detection on upstream optical OFDM data signals received from the ONUs on the wavelength by reusing the optical source in the OLT as a local oscillator to minimize frequency offset of the upstream signals.

11. The method of claim 10, wherein the performing further comprises coupling the upstream optical signals with a continuous wave signal generated by the optical source such that the continuous wave signal has a higher intensity than the intensities of the upstream optical data signals.

12. The method of claim 11, wherein the performing further comprises photodetecting the upstream optical data signals subsequent to the coupling.

13. The method of claim 10, wherein said first signals are continuous wave signals, wherein said wavelength is a first wavelength and wherein the method further comprises:

combining the continuous wave signals with downstream optical Orthogonal Frequency Division Multiplexed (OFDM) data signals that are on a second wavelength that is generated by a different optical source, wherein said distributing comprises distributing the combined downstream optical signals to the plurality of optical network units.

14. The method of claim 10, wherein said first signals are downstream optical Orthogonal Frequency Division Multiplexed (OFDM) data signals.

15. The method of claim 10, wherein the upstream optical signals are received simultaneously.

16. A method for processing communication signals in an optical network unit (ONU) of an Orthogonal Frequency Division Multiple Access (OFDMA)-Passive Optical Network (PON) comprising:

receiving first signals on a wavelength from an optical line terminal (OLT);

performing carrier suppression, at the ONU, on an optical carrier on the wavelength received from the OLT while modulating the suppressed optical carrier to generate upstream optical OFDM data signals for transmission on the suppressed optical carrier on the wavelength.

17. The method of claim 16, wherein the performing further comprises adjusting a direct current bias such that the intensities of the upstream optical OFDM data signals are higher than the intensity of the optical carrier to minimize beating noise at the OLT stemming from receiving the upstream signals from a plurality of ONUs operating on the same wavelength.

18. The method of claim 16, wherein said first signals are continuous wave signals, wherein said wavelength is a first wavelength, wherein said first signals are combined with downstream optical Orthogonal Frequency Division Multiplexed (OFDM) data signals on a second wavelength when received by the GNU, and wherein the method further comprises:

separating the continuous wave signals on the first wavelength from the downstream optical data signals on the second wavelength, wherein the performing comprises performing carrier suppression on the continuous wave signals while modulating the continuous wave signals to generate the upstream optical OFDM data signals for transmission on the first wavelength.

19. The method of claim 18 further comprising:

photodetecting the downstream optical data signals.

20. The method of claim 16, wherein said first signals are downstream optical Orthogonal Frequency Division Multiplexed (OFDM) data signals.

* * * * *